2,862,966

N-ALKYL-N-(SUBSTITUTED-BENZYL)DIHALO-ACETAMIDES AND THEIR PREPARATION

Alexander R. Surrey, Albany, N. Y., assignor to Sterling Drug Inc., New York, N. Y., a corporation of Delaware No Drawing. Application December 9, 1955
Serial No. 551,975

16 Claims. (Cl. 260—562)

This invention relates to novel N-(lower alkyl)-N-(substituted-benzyl)dihaloacetamides, to their preparation, and to amebacidal compositions containing these compounds as active ingredients thereof.

During and since World War II, it has become increasingly apparent that amebiasis is even more serious a problem than had been previously assumed. This realization has stimulated the search for new drugs effective in treating this debilitating disease. The search has been directed toward finding highly effective, non-toxic, non-metallic and relatively inexpensive remedies to improve on the presently available and only limitedly useful drugs such as carbasone, chiniofon, diiodohydroxyquinoline and emetine bismuth iodide. Other workers recently have found the relatively new chlortetracycline and oxytetracycline to be highly effective; however, these antibiotics suffer the disadvantages of being relatively expensive and, when tested in hamsters, of producing marked bloating of the cecum and altering the cecal flora. It is well-known that these antibiotics also often adversely disturb and alter the intestinal flora in human patients because of their broad antibacterial spectrum. In contrast, my new compounds have very slight if any antibacterial activity and can be expected therefore to have little if any effect on the normal intestinal flora.

My search has resuled in the compounds of the instant invention, these compounds having the general formula

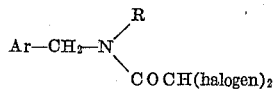

where Ar is a phenyl radical substituted by from one to three radicals selected from the group consisting of halogen, lower alkoxy, lower alkylmercapto, lower alkylsulfonyl and nitro, and R is a lower alkyl radical.

These compounds not only have markedly high amebacidal activities as evidenced by cure of hamsters infected with amebiasis, but also surprisingly low toxicities. Moreover, they have a novel and relatively simple chemical structure that does not resemble and is not suggested by any amebacidal agent known prior to my work in this field. My new compounds of course vary among themselves in magnitude of amebacidal activity, but even the less active embodiments are from three to four times more active than the commercial amebacidal agents, chiniofon and diiodohydroxyquinoline, while the more active embodiments are from about 25 to 35 times more active than these two commercial quinoline amebacides; from about 5 to 6 times more active than carbasone (the commercial arsenical preparation); and from about 2 to 3 times more active than the relatively new, highly active antibiotic amebacides, chlortetracycline and oxytetracycline. This unusually high activity of some members has created an entirely new standard of evaluating effectiveness of amebacidal agents.

Coupled with this unusually high activity, my compounds have remarkably low toxicities; for example, the highly active embodiment, N-(2,4-dichlorobenzyl)-N-isopropyldichloroacetamide ($ED_{50}$ of $8.65 \pm 1.7$ mg./kg./day, this value being the minimum effective dose necessary to clear 50% of the hamsters infected with *Endamoeba criceti*), has an oral acute $LD_{50}$ toxicity in mice greater than 4000 mg. per kg. Other embodiments are even less toxic, having toxicities greater than 8000 mg. per kg.

In the above formula for my new compounds, the substituents of the phenyl radical designated by Ar can be in any of the available positions of the phenyl nucleus, and where more than one, can be the same or different and can be in any of the various position combinations relative to each other. The halo substituents include chloro, bromo, iodo and fluoro. The lower alkoxy, lower alkylmercapto and lower alkylsulfonyl substituents have preferably one to six carbon atoms, including such substituents as: methoxy, ethoxy, methylenedioxy, ethylenedioxy, n-propoxy, isopropoxy, isobutoxy, n-pentoxy, n-hexoxy and the like for lower alkoxy; methylmercapto, ethylmercapto, n-propylmercapto, isobutylmercapto, n-hexylmercapto and the like for lower alkylmercapto; and methylsulfonyl, ethylsulfonyl, n-propylsulfonyl, isobutylsulfonyl, n-hexylsulfonyl and the like for lower alkylsulfonyl.

The lower alkyl radical of the above general formula, designated as R, has preferably from one to six carbon atoms and includes such examples as methyl, ethyl, n-propyl, isopropyl, n-butyl, isobutyl, 2-butyl, n-pentyl, 3-methylbutyl, n-hexyl, 2-methylpentyl, and the like.

The halogen atoms of the dihaloacetyl radicals of my compounds, designated in the above formula as

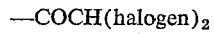

can be chloro, bromo, iodo or fluoro, such dihaloacetyl radicals including dichloroacetyl, dibromoacetyl, diiodoacetyl, difluoroacetyl, bromochloroacetyl, bromoiodoacetyl, and the like.

The compounds of my invention were prepared by treating an N-(lower alkyl)-substituted-benzylamine of the formula, Ar—$CH_2NH$—R, with a dihaloacetyl halide, where Ar and R have the meanings given above. The halo radical attached to the carbonyl function, was preferably chloro; however, other halo radicals, i. e., bromo, iodo, fluoro, also can be used. Illustrations of the process of my invention are: the preparation of N-isopropyl-N-(3,4,5-tribromobenzyl)dichloroacetamide by treating N-isopropyl-3,4,5-tribromobenzylamine with dichloroacetyl chloride; the preparation of N-isobutyl-N-(3,4-diethoxybenzyl)dibromoacetamide by treating N-isobutyl-3,4-diethoxybenzylamine with dibromoacetyl bromide; N-n-hexyl-N-(4-nitrobenzyl)diiodoacetamide by treating N-n-hexyl-4-nitrobenzylamine with diiodoacetyl iodide; the preparation of N-isopropyl-N-(2,4-dichlorobenzyl)bromochloroacetamide by treating N-isopropyl-2,4-dichlorobenzylamine with bromochloroacetyl chloride. The reaction was carried out preferably below room temperature, with chilling as necessary.

The compounds where the lower alkyl radical R is methyl were prepared also by reacting an N-methyl-substituted-benzylamine, Ar—$CH_2NHCH_3$, with a lower alkyl dihaloacetate, e. g., methyl dichloroacetate, where the lower alkyl portion of this intermediate ester has from one to six carbon atoms. Illustrations of this modification of my process are: the preparation of N-methyl-N-(2,4-dichlorobenzyl)dichloroacetamide by reacting N-methyl-2,4-dichlorobenzylamine with methyl dichloroacetate; and the preparation of N-methyl-N-(4-n-butoxybenzyl)dibromoacetamide by reacting N-methyl-4-n-butoxybenzylamine with ethyl dibromoacetate. The reaction was run by mixing the reactants and allowing them to stand from about one to four days at room temperature or by heating the reaction mixture for shorter periods (such as about 12 to 18 hours, at an elevated temperature (such as 45 to 60° C.) I found that N-(lower alkyl)-substituted-benzylamines where the lower alkyl radical is larger than methyl would not undergo the reaction with the lower alkyl dihaloacetates to form the corresponding disubstituted dihaloacetamides.

The intermediate N-(lower alkyl)-substituted-benzylamines were prepared either by treating a substituted-benzaldehyde of the formula ArCHO with an alkylamine of the formula $RNH_2$ followed by catalytic reduction of the anil, $ArCH=N-R$, or by treating a substituted-benzyl halide, $ArCH_2$-halogen, with an alkylamine, $RNH_2$. Illustrations of these two procedures for preparing the intermediate N-(lower alkyl)-substituted-benzylamines are given, respectively, as follows: the preparation of N-isopropyl-2,4,6-triiodobenzylamine by treating 2,4,6-triiodobenzaldehyde with isopropylamine to form the anil which is then catalytically reduced; the formation of N-isopropyl-4-n-butoxybenzylamine by treating 4-n-butoxybenzyl chloride with isopropylamine.

My invention is further illustrated by the following examples without however being limited thereto.

EXAMPLE 1

A. *N-(lower alkyl)-substituted-benzylamines from substituted-benzyl halides*

This method of preparing the intermediate N-(lower alkyl)-substituted-benzylamines is illustrated by the following preparation of N-isopropyl-2,4-dichlorobenzylamine: 39.4 g. of 2,4-dichlorobenzyl chloride was added dropwise with stirring to 72 g. of isopropylamine over a period of one hour. After the mixture had stood overnight at room temperature, it was warmed on a steam bath, poured into water and the aqueous mixture was treated with sodium hydroxide solution. The oil that separated was extracted with benzene. The benzene extract was dried and then the benzene was removed by distillation and the product was fractionally distilled. There was thus obtained 31 g. of N-isopropyl-2,4-dichlorobenzylamine, B. P. 126–127° C. at 7 mm., $n_D^{25}$ 1.5320.

*Analysis.*—Calcd. for $C_{10}H_{13}Cl_2N$: N, 6.42. Found: N, 6.15.

Other N-(lower alkyl)-substituted-benzylamines prepared by the above illustrated procedure, using the appropriate substituted-benzyl chloride and lower alkylamine, are given in the following paragraphs:

N-isopropyl-3,4-dichlorobenzylamine (22 g.), B. P. 151° C. at 15 mm., $n_D^{25}$ 1.5329, prepared from 59 g. of 3,4-dichlorobenzyl chloride and 108 g. of isopropylamine. *Analysis.*—Calcd. for $C_{10}H_{13}Cl_2N$: N, 6.42. Found: N, 6.31.

N-isopropyl-4-chlorobenzylamine (26.5 g.), B. P. 70–74° C. at 0.9 mm., $n_D^{25}$ 1.5490, prepared from 32.2 g. of 4-chlorobenzyl chloride and 72 g. of isopropylamine. Converted into the corresponding hydrochloride, M. P. 195–196° C. (corr.). *Analysis.*—Calcd. for

$C_{10}H_{14}ClN.HCl$

Cl⁻, 16.14. Found: Cl⁻, 15.97.

N-isopropyl-4-nitrobenzylamine hydrochloride (11 g.), M. P. 225–227° C., prepared from 8.5 g. of 4-nitrobenzyl chloride and 30 g. of isopropylamine. *Analysis.*—Calcd. for $C_{10}H_{14}N_2O_2.HCl$: Cl⁻, 15.10. Found: Cl⁻, 15.26.

N-isopropyl-2-chlorobenzylamine (25 g.), B. P. 70° C. at 0.9 mm., $n_D^{25}$ 1.5180, prepared from 32.2 g. of 2-chlorobenzyl chloride and 72 g. of isopropylamine. *Analysis.*—Calcd. for $C_{10}H_{14}ClN$: N, 6.40. Found: N, 7.36. N-isopropyl-2-chlorobenzylamine hydrochloride, M. P. 195–196° C. (corr.). *Analysis.*—Calcd. for $C_{10}H_{14}ClN.HCl$: Cl⁻, 16.14. Found: Cl⁻, 15.97.

N-(n-butyl)-2,4-dichlorobenzylamine (38.5 g.), B. P. 100–105° C. at 0.1 mm., prepared from 44 g. of 2,4-dichlorobenzyl chloride and 73 g. of n-butylamine. *Analysis.*—Calcd. for $C_{11}H_{15}Cl_2N$: N, 6.03. Found N, 5.84.

N-(2-butyl)-2,4-dichlorobenzylamine (21.5 g.), B. P. 86° C. at 0.1 mm., prepared from 25.2 g. of 2,4-dichlorobenzyl chloride and 42 g. of 2-butylamine. *Analysis.*—Calcd. for $C_{11}H_{15}Cl_2N$: N, 6.03. Found: N, 5.83.

N-(n-butyl)-3,4-dichlorobenzylamine (35 g.), B. P. 105° C. at 0.25 mm., prepared from 44 g. of 3,4-dichlorobenzyl chloride and 73 g. of n-butylamine. *Analysis.*—Calcd. for $C_{11}H_{15}Cl_2N$: N, 6.03. Found: N, 5.92.

N-(n-propyl)-2,4-dichlorobenzylamine (16 g.), B. P. 152° C. at 15.0 mm., prepared from 20 g. of 2,4-dichlorobenzyl chloride and 30 g. of n-propylamine. *Analysis.*—Calcd. for $C_{10}H_{13}Cl_2N$: N, 6.42. Found: N, 6.18.

N-isobutyl-3,4-dichlorobenzylamine (37.5 g.), B. P. 95° C. at 0.2 mm., prepared from 44 g. of 3,4-dichlorobenzyl chloride and 73 g. of isobutylamine. *Analysis.*—Calcd. for $C_{11}H_{15}Cl_2N$: N, 6.03. Found: N, 5.92.

N-methyl-2,4-dichlorobenzylamine (21 g.), B. P. 121–123° C. at 13 mm., $n_D^{25}$ 1.5527, prepared from 46 g. of 2,4-dichlorobenzyl chloride and 54 g. of methylamine in 200 ml. of ethanol. *Analysis.*—Calcd. for $C_8H_9Cl_2N$: N, 7.37. Found: N, 7.29.

Other N-(lower alkyl)-substituted-benzylamines can be prepared according to the procedure given above using the appropriate substituted-benzyl halide and lower alkylamine; such compounds include N-isopropyl-2,4-dibromobenzylamine, N-isopropyl-3,4-diiodobenzylamine, N-methyl-4-fluorobenzylamine, N-isopropyl-4-bromobenzylamine, N-isobutyl-3,4,5-trichlorobenzylamine, N-ethyl-4-bromo - 2 - chlorobenzylamine, N - isopropyl - 2,4 - difluorobenzylamine, N-isopropyl-3,4-dinitrobenzylamine, N - n - hexyl - 4 - nitrobenzylamine, N - (2 - methylbutyl) - 3,4 - dichlorobenzylamine, and the like.

B. *N-isopropyl-N-(2,4-dichlorobenzyl)-dichloroacetamide*

7.5 g. of dichloroacetyl chloride was added dropwise with stirring at 0° C. to a mixture of 10.9 g. of N-isopropyl-2,4-dichlorobenzylamine, 100 ml. of ethylene dichloride and 50 ml. of 1 N sodium hydroxide solution. The mixture was then allowed to warm up to room temperature and stirring was continued for one hour. The organic layer was separated, washed with 1 N hydrochloric acid, then water, and dried. The ethylene dichloride was removed by distillation and the residue which solidified was recrystallized from n-pentane, yielding 10 g. of N - isopropyl - N - (2,4 - dichlorobenzyl)dichloroacetamide, B. P. 71.9–73.8° C. (corr.).

*Analysis.*—Calcd. for $C_{12}H_{13}Cl_4NO$: C, 43.79; H, 3.98; $Cl_{KOH}$, 21.55. Found: C, 44.34; H, 3.74; $Cl_{KOH}$, 21.67.

When the above procedure is followed but using diiodoacetyl chloride, difluoroacetyl fluoride or bromochloroacetyl chloride in place of dichloroacetyl chloride, the following respective compounds result: N-isopropyl-N - (2,4 - dichlorobenzyl)diiodoacetamide, N - isopropyl-N - (2,4 - dichlorobenzyl)difluoroacetamide or N - isopropyl - N - (2,4 - dichlorobenzyl)bromochloroacetamide.

EXAMPLE 2

A. *N - (lower alkyl) - substituted - benzylamines from substituted-benzaldehydes*

This method of preparing the intermediate N-(lower alkyl)-substituted-benzylamines is illustrated by the following preparation of N - isopropyl - 4 - n - butoxybenzylamine: A mixture of 26.7 g. of 4-n-butoxybenzaldehyde and 9 g. of isopropylamine was warmed on a steam bath for thirty minutes and then dissolved in 125 ml. of ethanol and reduced catalytically with palladium-on-charcoal catalyst. After the catalyst had been filtered off, the filtrate was fractionally distilled, yielding 20.5 g. of N-isopropyl-4-n-butoxybenzylamine, B. P. 117–120° C. at 0.4 mm., $n_D^{25}$ 1.4960.

*Analysis.*—Calcd. for $C_{14}H_{23}NO$: N, 6.34. Found: N, 6.36.

Other N-(lower alkyl)-substituted-benzylamines prepared by the above procedure, using the appropriate substituted-benzaldehyde and lower alkylamine, are given in the following paragraphs:

N-isopropyl-3,4-methylenedioxybenzylamine (15 g.), B. P. 95–100° C. at 0.3 mm., $n_D^{25}$ 1.5220, prepared from 22.5 g. of 3,4-methylenedioxybenzaldehyde and 9 g. of isopropylamine. *Analysis.*—Calcd. for $C_{11}H_{15}NO_2$: N, 7.25. Found: N, 7.17.

N-ethyl-2-methoxybenzylamine (102 g.) B. P. 147–149° C. at 40.0 mm., prepared from 134.1 g. of 2-methoxybenzaldehyde and 415 ml. of 33% aqueous ethylamine. *Analysis.*—Calcd. for $C_{10}H_{15}NO$: N, 8.48. Found: N, 8.13.

N-methyl-2,3-dimethoxybenzylamine (76 g.), B. P. 89–98° C. at 0.5 mm., $n_D^{25}$ 1.5260, prepared from 166 g. of 2,3-dimethoxybenzaldehyde and 232 ml. of 40% aqueous methylamine. *Analysis.*—Calcd. for $C_{10}H_{15}NO_2$: N, 7.74. Found: N, 7.03.

N-ethyl-2,3-dimethoxybenzylamine (85 g.), B. P. 115–117° C. at 2 mm., $n_D^{25}$ 1.5188, prepared from 125 g. of 2,3-dimethoxybenzaldehyde and 312 ml. of 30% aqueous ethylamine. *Analysis.*—Calcd. for $C_{11}H_{17}NO_2$: N, 7.17. Found: 6.97.

N-methyl-4-n-butoxybenzylamine, B. P. 149–150° C. at 11 mm., $n_D^{25}$ 1.5091, prepared from 18 g. of 4-n-butoxybenzaldehyde and 125 ml. of 20% (wt./vol.) methanolic methylamine (0.7 mole). *Analysis.*—Calcd. for $C_{12}H_{19}NO$: N, 7.25. Found: N, 7.20.

N-ethyl-3,4-dichlorobenzylamine (35 g.), B. P. 85–95° C. at 0.6–0.8 mm., $n_D^{25}$ 1.5420, prepared from 90 g. of 3,4-dichlorobenzaldehyde and 200 ml. of 33% aqueous ethylamine. *Analysis.*—Calcd. for $C_9H_{11}Cl_2N$: N, 6.86. Found: N, 6.48.

Other N - (lower alkyl) - substituted - benzylamines can be prepared according to the procedure given above using the appropriate substituted-benzaldehyde and lower alkylamine; such compounds include N-isopropyl-3,4-diethoxybenzylamine, N - methyl - 4 - n - hexoxybenzylamine, N - isopropyl - 4 - isobutoxybenzylamine, N-(2 - methylbutyl) - 3,4,5 - trimethoxybenzylamine, N-isopropyl - 4 - n - butylmercaptobenzylamine, N - isopropyl-4-n-butylsulfonylbenzylamine, and the like.

B. *N-isopropyl-N-(4-n-butoxybenzyl)dichloroacetamide*

When the procedure described in Example 1B was followed but using 20 g. of N-isopropyl-4-n-butoxybenzylamine, 150 ml. of ethylene dichloride, 90 ml. of 1 N sodium hydroxide solution and 13.5 g. of dichloroacetyl chloride, there was obtained the product, N-isopropyl-N-(4-n-butoxybenzyl)dichloroacetamide, B. P. 167–170° C. at 0.01 mm.

*Analysis.*—Calcd. for $C_{16}H_{23}Cl_2NO_2$: C, 57.83; H, 6.97; Cl, 21.34. Found: C, 57.67; H, 7.11; Cl, 21.20.

Following the above procedure but using diiodoacetyl chloride, dibromoacetyl bromide or difluoroacetyl fluoride in place of dichloroacetyl chloride, the following respective products are obtained: N-isopropyl-N-(4-n-butoxybenzyl)diiodoacetamide, N - isopropyl - N - (4 - n-butoxybenzyl)dibromoacetamide and N - isopropyl - N - (4-n-butoxybenzyl)difluoroacetamide.

When the above procedure for the preparation of N-isopropyl - N - (4 - n - butoxybenzyl)dichloroacetamide is followed by using N - isopropyl - 3,4 - diethoxybenzylamine, N - methyl - 2,3 - dimethoxybenzylamine, N-methyl-4-n-hexoxybenzylamine, N-isopropyl-4-isobutoxybenzylamine, N - (2 - methylbutyl) - 3,4,5 - trimethoxybenzylamine, N - isopropyl - 4 - n - butylmercaptobenzylamine or N - isopropyl - 4 - n - butylsulfonylbenzylamine in place of N-isopropyl-4-n-butoxybenzylamine, the following respective products are obtained: N-isopropyl-N-(3,4-diethoxybenzyl)dichloroacetamide, N-methyl-N-(2,3 - dimethoxybenzyl)dichloroacetamide, N - methyl - N-(4 - n - hexoxybenzyl)dichloroacetamide, N - isopropyl-N - (4 - isobutoxybenzyl)dichloroacetamide, N - (2-methylbutyl) - N - (3,4,5 - trimethoxybenzyl)dichloroacetamide, N - isopropyl - N - (4 - n - butylmercaptobenzyl)dichloroacetamide or N - isopropyl - N - (4-n-butylsulfonylbenzyl)dichloroacetamide.

EXAMPLE 3

*N-isopropyl-N-(4-nitrobenzyl)dichloroacetamide*

When the procedure described in Example 1B was followed using 13.7 g. of N-isopropyl-4-nitrobenzylamine, 100 ml. of ethylene dichloride, 75 ml. of 1 N sodium hydroxide solution and 11.2 g. of dichloroacetyl chloride, there was obtained 12.2 g. of N-isopropyl-N-(4-nitrobenzyl)dichloroacetamide, M. P. 100.8–103.3° C. (corr.).

*Analysis.*—Calcd. for $C_{12}H_{14}Cl_2N_2O_3$: C, 47.24; H, 4.62; N, 9.18. Found: C, 47.44; H, 4.65; N, 8.90.

When the above procedure was followed but using N-isopropyl - 3,4 - dinitrobenzylamine or N - n - hexyl-4-nitrobenzylamine in place of N-isopropyl-4-nitrobenzylamine there can be obtained respectively N-isopropyl-N-(3,4 - dinitrobenzyl)dichloroacetamide or N - n - hexyl-N-(4-nitrobenzyl)dichloroacetamide.

EXAMPLE 4

*N-ethyl-N-(2,3-dimethoxybenzyl)dichloroacetamide*

Following the procedure described in Example 1B but using 14.8 g. of N-ethyl-2,3-dimethoxybenzylamine, 100 ml. of ethylene dichloride, 75 ml. of 1 N sodium hydroxide solution and 11.4 g. of dichloroacetyl chloride, there was obtained 12 g. of N-ethyl-N-(2,3-dimethoxybenzyl)dichloroacetamide, B. P. 157–158° C. at 0.6 mm.

*Analysis.*—Calcd. for $C_{13}H_{17}Cl_2NO_3$: C, 51.01; H, 5.60; Cl, 23.17. Found: C, 50.96; H, 5.75; Cl, 22.98.

EXAMPLE 5

*N-n-Butyl-N-(2,4-dichlorobenzyl)dichloroacetamide*

Following the procedure described in Example 1B but using 11.6 g. of N-n-butyl-2,4-dichlorobenzylamine, 100 ml. of ethylene dichloride, 50 ml. of 1 N sodium hydroxide solution and 7.5 ml. of dichloroacetyl chloride, there was obtained 10 g. of N-n-butyl-N-(2,4-dichlorobenzyl)-dichloroacetamide, B. P. 147–149° C. at 0.05 mm.

*Analysis.*—Calcd. for $C_{13}H_{15}Cl_4NO$: C, 15.51; H, 4.40; Cl, 41.34. Found: C, 45.30; H, 4.30; Cl, 41.04.

EXAMPLE 6

*N-2-butyl-N-(3,4-dichlorobenzyl)dichloroacetamide*

This preparation was carried out following the procedure described in Example 1B but using 11.6 g. of N-2-butyl-3,4-dichlorobenzylamine, 100 ml. of ethylene dichloride, 50 ml. of 1 N sodium hydroxide solution and 7.5 ml. of dichloroacetyl chloride. There was thus obtained 8 g. of N-2-butyl-N-(3,4-dichlorobenzyl)dichloroacetamide, B. P. 155° C. at 0.06 mm.

*Analysis.*—Calcd. for $C_{13}H_{15}Cl_4NO$: C, 45.51; H, 4.40; Cl, 41.34. Found: C, 45.21; H, 4.90; Cl, 41.23.

EXAMPLE 7

*N-n-butyl-N-(3,4-dichlorobenzyl)dichloroacetamide*

This preparation was carried out following the procedure described in Example 1B but using 11.6 g. of N-n-butyl-3,4-dichlorobenzylamine, 100 ml. of ethylene dichloride, 50 ml. of 1 N sodium hydroxide solution and 7.5 g. of dichloroacetyl chloride. There was thus obtained 6 g. of N-n-butyl-N-(3,4-dichlorobenzyl)dichloroacetamide, M. P. 59.2–60.2° C. (corr.) when recrystallized from n-hexane.

EXAMPLE 8

*N-n-propyl-N-(2,4-dichlorobenzyl)dichloroacetamide*

This preparation was carried out following the procedure described in Example 1B but using 10.9 g. of N-n-propyl-2,4-dichlorobenzylamine, 100 ml. of ethylene dichloride, 50 ml. of 1 N sodium hydroxide solution and 7.5 g. of dichloroacetyl chloride. There was thus obtained 7.5 g. of N-n-propyl-N-(2,4-dichlorobenzyl)dichloroacetamide, B. P. 150° C. at 0.05 mm.

*Analysis.*—Calcd. for $C_{12}H_{13}Cl_4NO$: C, 43.79; H, 3.98; $Cl_{KOH}$, 21.55. Found: C, 43.49; H, 4.24; $Cl_{KOH}$, 21.62.

EXAMPLE 9

*N-isobutyl-N-(3,4-dichlorobenzyl)dichloroacetamide*

When the procedure described in Example 1B was followed but using 11.6 g. of N-isobutyl-3,4-dichlorobenzylamine, 100 ml. of ethylene dichloride, 50 ml. of 1 N sodium hydroxide solution and 7.5 g. of dichloroacetyl chloride, there was obtained 10 g. of N-isobutyl-N-(3,4-dichlorobenzyl)dichloroacetamide, M. P. 81.8–84.6° C. (corr.) when recrystallized from n-heptane.

*Analysis.*—Calcd. for $C_{13}H_{15}Cl_4NO$: C, 45.51; H, 4.40; Cl, 41.34. Found: C, 45.63; H, 4.82; Cl, 40.92.

EXAMPLE 10

*N-ethyl-N-(2-methoxybenzyl)dichloroacetamide*

Following the procedure described in Example 1B but using 12.4 g. of N-ethyl-2-methoxybenzylamine, 100 ml. of ethylene dichloride, 75 ml. of 1 N sodium hydroxide solution and 11.4 g. of dichloroacetyl chloride, there was obtained 11 g. of N-ethyl-N-(2-methoxybenzyl)dichloroacetamide, B. P. 135° C. at 0.03 mm.

*Analysis.*—Calcd. for $C_{12}H_{15}Cl_2NO_2$: C, 52.18; H, 5.47; Cl, 25.67. Found: C, 52.40; H, 5.61; Cl, 25.25.

EXAMPLE 11

*N-isopropyl-N-(3,4-dichlorobenzyl)dichloroacetamide*

When the procedure described in Example 1B was followed but using 10 g. of N-isopropyl-3,4-dichlorobenzylamine, 100 ml. of ethylene dichloride, 45 ml. of 1 N sodium hydroxide solution and 6.7 g. of dichloroacetyl chloride, there was obtained 7 g. of N-isopropyl-N-(3,4-dichlorobenzyl)dichloroacetamide, M. P. 71.8–75.6° C. (corr.) when recrystallized from n-heptane.

*Analysis.*—Calcd. for $C_{12}H_{13}Cl_4NO$: C, 43.79; H, 3.98; Cl, 43.09. Found: C, 43.84; H, 4.08; Cl, 42.51.

Other N-(lower alkyl)-N-(halogenated-benzyl) dichloroacetamides can be prepared according to the procedure given above but using other N-(lower alkyl)-halogenated-benzylamines in place of N-isopropyl-3,4-dichlorobenzylamine. Thus, using N-isopropyl-2,4-dibromobenzylamine, N-isopropyl-3,4-diiodobenzylamine, N-methyl-4-fluorobenzylamine, N-isopropyl-4-bromobenzylamine, N-isobutyl-3,4,5-trichlorobenzylamine, N-ethyl-4-bromo-2-chlorobenzylamine, N-isopropyl-2,4-difluorobenzylamine or N-(2-methylbutyl)-3,4-dichlorobenzylamine, there is obtained, respectively, N-isopropyl-N-(2,4-dibromobenzyl)dichloroacetamide, N-isopropyl-N-(3,4-diiodobenzyl)dichloroacetamide, N-methyl-N-(4-fluorobenzyl)dichloroacetamide, N-isopropyl-N-(4-bromobenzyl)dichloroacetamide, N-isobutyl-N-(3,4,5-trichlorobenzyl)dichloroacetamide, N-ethyl-N-(4-bromo-2-chlorobenzyl)dichloroacetamide, N-isopropyl-N-(2,4-difluorobenzyl)dichloroacetamide or N-(2-methylbutyl)-N-(3,4-dichlorobenzyl)dichloroacetamide.

EXAMPLE 12

*N-isopropyl-N-(4-chlorobenzyl)dichloroacetamide*

When the procedure described in Example 1B was followed but using 11 g. of N-isopropyl-4-chlorobenzylamine, 100 ml. of ethylene dichloride, 50 ml. of 1 N sodium hydroxide solution and 7.5 g. of dichloroacetyl chloride, there was obtained 9 g. of N-isopropyl-N-(4-chlorobenzyl)dichloroacetamide, M. P. 89.7–93.1° C. (corr.).

*Analysis.*—Calcd. for $C_{12}H_{14}Cl_3NO$: C, 48.92; H, 4.79; $Cl_{KOH}$, 24.00. Found: C, 48.70; H, 4.68; $Cl_{KOH}$, 24.11.

EXAMPLE 13

*N-isopropyl-N-(3,4-methylenedioxybenzyl)-dichloroacetamide*

Following the procedure described in Example 1B but using 12 g. of N-isopropyl-3,4-methylenedioxybenzylamine, 100 ml. of ethylene dichloride, 62 ml. of 1 N sodium hydroxide solution and 9.25 g. of dichloroacetyl chloride, there was obtained 15 g. of N-isopropyl-N-(3,4-methylenedioxybenzyl)dichloroacetamide, B. P. 158–165° C. at 0.01 mm.

*Analysis.*—Calcd. for $C_{13}H_{15}Cl_2NO$: C, 51.32; H, 4.97; Cl, 23.31. Found: C, 51.41; H, 4.95; Cl, 23.48.

EXAMPLE 14

*N-isopropyl-N-(2-chlorobenzyl)dichloroacetamide*

This preparation was carried out following the procedure described in Example 1B but using 21.9 g. of N-isopropyl-2-chlorobenzylamine, 100 ml. of ethylene dichloride, 100 ml. of 1 N sodium hydroxide solution and 15 g. of dichloroacetyl chloride. There was thus obtained 22 g. of N-isopropyl-N-(2-chlorobenzyl)dichloroacetamide, B. P. 128° C. at 0.5 mm. and M. P. 71.7–76.1° C. (corr.).

*Analysis.*—Calcd. for $C_{12}H_{14}Cl_3NO$: C, 48.92; H, 4.79; Cl, 36.10. Found: C, 48.60; H, 4.90; Cl, 36.20.

EXAMPLE 15

*N-methyl-N-(4-n-butoxybenzyl)dichloroacetamide*

A mixture of 12.5 g. of N-methyl-4-n-butoxybenzylamine and 10 g. of methyl dichloroacetate was allowed to stand at room temperature for four days. The reaction mixture was then dissolved in benzene and washed several times with 1 N hydrochloric acid, water, 2.5% aqueous sodium hydroxide solution and, finally, water. The benzene solution was dried over anhydrous calcium sulfate and the benzene was removed by distillation to give the product, N-methyl-N-(4-n-butoxybenzyl)dichloroacetamide, melting point 43.7–45.9° C. (corr.) after two recrystallizations from n-hexane.

*Analysis*—Calcd. for $C_{14}H_{19}Cl_2NO_2$: C, 55.28; H, 6.29; Cl, 23.30. Found: C, 55.45, 55.51; H, 6.14, 6.39; Cl, 24.02.

Following the above procedure but using the ethyl, n-propyl, isobutyl or n-hexyl ester of dichloroacetic acid in place of methyl dichloroacetate, there is obtained the same product, N-methyl-N-(4-n-butoxybenzyl)dichloroacetamide.

When the above procedure is followed but using methyl dibromoacetate in place of methyl dichloroacetate, the resulting product is N-methyl-N-(4-n-butoxybenzyl)dibromoacetamide.

EXAMPLE 16

*N-ethyl-N-(3,4-dichlorobenzyl)dichloroacetamide*

This compound was prepared following the procedure described in Example 1B using 20 g. of N-ethyl-3,4-dichlorobenzylamine, 100 ml. of ethylene dichloride, 100 ml. of an aqueous solution containing 4 g. of sodium hydroxide and 11.5 g. of dichloroacetyl chloride. The product, N-ethyl-N-(3,4-dichlorobenzyl)dichloroacetamide, melted at 77.2–83.2° C. (corr.) after distillation in vacuo (at 145–150° C. at 0.1 mm., yielding a colorless oil which solidified) and several recrystallizations from n-hexane.

*Analysis.*—Calcd. for $C_{11}H_{11}Cl_4NO$: C, 41.94; H, 3.52; Cl, 22.52. Found: C, 41.93; H, 3.67; Cl, 22.26.

EXAMPLE 17

N-methyl-N-(2,4-dichlorobenzyl)dichloroacetamide

This preparation was carried out like the procedure of Example 15 using 10.4 g. of N-methyl-2,4-dichlorobenzylamine and 9 g. of methyl dichloroacetate and the reaction period of eighteen hours at about 45–50° C. The reaction mixture was filtered, dissolved in benzene and the benzene solution filtered. The benzene filtrate was washed with 1 N hydrochloric acid, 2.5% sodium hydroxide solution and then water; it was then dried over anhydrous calcium sulfate and the benzene removed in vacuo to yield an oily product. This product, N-methyl-N-(2,4-dichlorobenzyl)dichloroacetamide, was purified by distillation, B. P. 130° C. at 0.001 mm., $n_D^{25}$ 1.5767.

*Analysis.*—Calcd. for $C_{10}H_9Cl_4NO$: C, 39.89; H, 3.01; Cl, 47.12. Found: C, 40.23; H, 2.96; Cl, 47.77.

Following the above procedure using, in place of N-methyl-2,4-dichlorobenzylamine, N-methyl-4-methylmercaptobenzylamine, N-methyl-4-methylsulfonylbenzylamine, N-methyl-4-nitrobenzylamine, N-methyl-3-nitrobenzylamine, N-methyl-2-n-propoxy-4-nitrobenzylamine, the following respective products are obtained: N-methyl-N-(4-methylmercaptobenzyl)dichloroacetamide, N-methyl-N-(4-methylsulfonylbenzyl)dichloroacetamide, N-methyl-N-(4-nitrobenzyl)dichloroacetamide, N-methyl-N-(3-nitrobenzyl)dichloroacetamide, and N-methyl-N-(2-n-propoxy-4-nitrobenzyl)dichloroacetamide.

The N-(lower alkyl)-N-(substituted-benzyl)dihaloacetamides of the foregoing examples when administered orally in aqueous suspension to hamsters infected with *Endamoeba criceti* were found to completely clear the animals of the infection at drug levels below 100 mg. per kg. of body weight. Some of the compounds, for instance, N-isopropyl-N-(2,4-dichlorobenzyl)dichloroacetamide, N-isopropyl-N-(3,4-dichlorobenzyl)dichloroacetamide, N-isopropyl-N-(4-chlorobenzyl)dichloroacetamide, N-isopropyl-N-(4-n-butoxybenzyl)dichloroacetamide, N-methyl-N-(4-n-butoxybenzyl)dichloroacetamide and N-ethyl-N-(3,4-dichlorobenzyl)dichloroacetamide have $ED_{50}$ values in the range between 8 and 20 mg. per kg. of body weight, $ED_{50}$ meaning the effective dose necessary to clear 50% of the hamsters of the amebic infection. Coupled with this outstandingly high activity, my compounds have very low toxicities. For example, N-isopropyl-N-(2,4-dichlorobenzyl)dichloroacetamide has an acute oral $LD_{50}$ (mice; 7-day) of greater than 4000 mg. per kg.; and N-methyl-N-(4-n-butoxybenzyl)dichloroacetamide has an acute oral $ALD_{50}$ (mice; 7-day) of greater than 8000 mg. per kg.

For purposes of comparison, the amebacidal activities (in terms of $ED_{50}$ values determined as outlined above) of available drugs of commerce are given as follows: chiniofon, 286 mg. per kg.; diiodohydroxyquinoline, 235 mg. per kg.; carbasone, 45 mg. per kg.; chlortetracycline, 22.9 mg. per kg.; and oxytetracycline, 18.75 mg. per kg.

For practical medication, my new N-alkyl-N-(substituted-benzyl)dihaloacetamides are best administered orally in solid form with the aid of a carrier. Thus, the compounds can be formulated in unit dosage form as tablets in combination with an adjuvant such as one or more of the following: calcium carbonate, starch, gelatin, talc, magnesium stearate, acacia, and the like, or, alternatively, they can be employed in capsule form either alone or admixed with an adjuvant. My compounds can also be advantageously combined with other amebacides such as chloroquine when desired. Illustrative of a tablet formulation of my compounds is one weighing 660 mg. and containing 500 mg. of N-isopropyl-N-(2,4-dichlorobenzyl)dichloroacetamide, 25 mg. of calcium carbonate as a diluent, 90 mg. of starch as a disintegrator, 30 mg. of gelatin as a binder and 15 mg. of talcum as a lubricant. Illustrative of a capsule formulation is one containing 500 mg. of N-methyl-N-(4-n-butoxybenzyl) dichloroacetamide, 40 mg. of starch and 10 mg. of talcum. Other tablet and capsule formulations can be made varying the quantities of adjuvants or using other N-(lower alkyl)-N-(substituted-benzyl)dihaloacetamides as active amebacidal ingredients.

This application is a continuation-in-part of my copending application Serial No. 352,058, filed April 29, 1953, now abandoned.

I claim:

1. An N-(lower alkyl)-N-(substituted-benzyl)dihaloacetamide having the formula

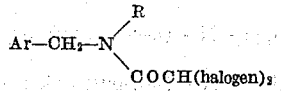

where Ar is the phenyl radical substituted at one to three of its five available positions only by from one to three radicals selected from the group consisting of halogen, lower alkoxy, lower alkylmercapto, lower alkylsulfonyl and nitro, and R is a lower alkyl radical.

2. An N-(lower alkyl)-N-(dihalobenzyl)dihaloacetamide having the formula

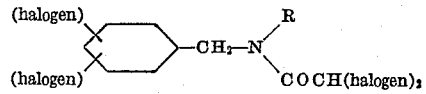

where R is a lower alkyl radical.

3. An N-(lower alkyl)-N-(monoalkoxybenzyl)dihaloacetamide having the formula

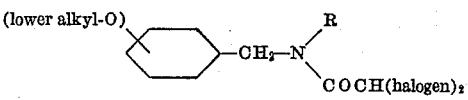

where R is a lower alkyl radical.

4. An N-isopropyl-N-(dihalobenzyl)dihaloacetamide having the formula

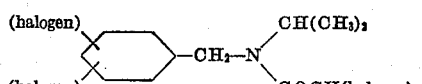

5. An N-(lower alkyl)-N-(monohalobenzyl)dihaloacetamide having the formula

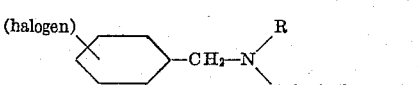

where R is a lower alkyl radical.

6. An N-isopropyl-N-(monohalobenzyl)dihaloacetamide having the formula

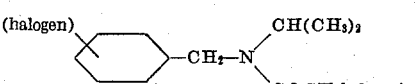

7. An N-isopropyl-N-(monoalkoxybenzyl)dihaloacetamide having the formula

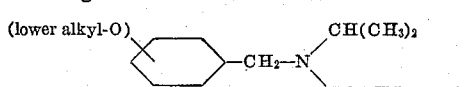

8. An N-isopropyl-N-(dihalobenzyl)dichloroacetamide having the formula

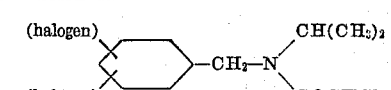

9. An N-isopropyl-N-(monohalobenzyl)dichloroacetamide having the formula

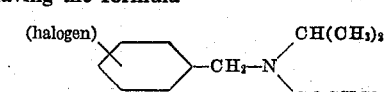

10. An N-isopropyl-N-(monoalkoxybenzyl)dichloroacetamide having the formula

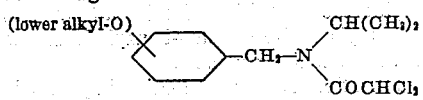

11. N-isopropyl-N-(2,4-dichlorobenzyl)dichloroacetamide.
12. N-isopropyl-N-(3,4-dichlorobenzyl)dichloroacetamide.
13. N-isopropyl-N-(4-chlorobenzyl)dichloroacetamide.
14. N-isopropyl-N-(4-n-butoxybenzyl)dichloroacetamide.
15. N-methyl-N-(4-n-butoxybenzyl)dichloroacetamide.
16. N-ethyl-N-(3,4-dichlorobenzyl)dichloroacetamide.

References Cited in the file of this patent

UNITED STATES PATENTS

| | | |
|---|---|---|
| 2,569,288 | Cassell et al. | Sept. 25, 1951 |
| 2,732,402 | Surrey | Jan. 24, 1956 |

OTHER REFERENCES

Mannich et al.: "Archiv der Pharm.," vol. 250 (1912), pp. 546 and 544.

Isshiki et al.: "J. Pharm. Soc. Japan," vol. 72 (1952), pp. 72 and 73.

Kushner et al.: "J. Org. Chem.," vol. 16 (1951), pp. 1283 to 1288.

Rebstock et al.: "J. Am. Chem. Soc.," vol. 73 (1951), p. 3670.